US009959022B2

(12) United States Patent
Anghelescu et al.

(10) Patent No.: US 9,959,022 B2
(45) Date of Patent: May 1, 2018

(54) SYSTEMS AND METHODS FOR DISPLAYING WELLS AND THEIR RESPECTIVE STATUS ON AN ELECTRONIC MAP

(71) Applicant: Landmark Graphics Corporation, Houston, TX (US)

(72) Inventors: Florin Mugur Anghelescu, Calgary (CA); David Crawshay, Katy, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 90 days.

(21) Appl. No.: 14/778,693

(22) PCT Filed: Jun. 21, 2013

(86) PCT No.: PCT/US2013/046958
§ 371 (c)(1),
(2) Date: Sep. 21, 2015

(87) PCT Pub. No.: WO2014/204481
PCT Pub. Date: Dec. 24, 2014

(65) Prior Publication Data
US 2016/0098174 A1 Apr. 7, 2016

(51) Int. Cl.
*G06F 3/00* (2006.01)
*G06F 3/0484* (2013.01)
*E21B 41/00* (2006.01)
*G06F 3/0481* (2013.01)
*G06F 3/01* (2006.01)

(52) U.S. Cl.
CPC .......... *G06F 3/04842* (2013.01); *E21B 41/00* (2013.01); *E21B 41/0092* (2013.01); *G06F 3/0481* (2013.01)

(58) Field of Classification Search
CPC .... G06F 3/04842; G06F 3/0481; E21B 41/00; E21B 41/0092
See application file for complete search history.

(56) References Cited

U.S. PATENT DOCUMENTS

| 8,204,692 | B2* | 6/2012 | Arango | E21B 44/00 |
| | | | | 340/853.2 |
| 2004/0225955 | A1* | 11/2004 | Ly | G06Q 10/06 |
| | | | | 715/273 |
| 2005/0103491 | A1* | 5/2005 | Newman | E21B 41/00 |
| | | | | 166/250.01 |
| 2005/0222772 | A1* | 10/2005 | Koederitz | E21B 21/08 |
| | | | | 702/6 |

(Continued)

FOREIGN PATENT DOCUMENTS

| EA | 009552 B1 | 2/2008 |
| WO | 2008076426 A2 | 6/2008 |

OTHER PUBLICATIONS

Australian Patent Application No. 2013392622, Second Examination Report, dated Nov. 15, 2016, 3 pages.

(Continued)

*Primary Examiner* — Nicholas Augustine
(74) *Attorney, Agent, or Firm* — Kilpatrick Townsend & Stockton LLP

(57) ABSTRACT

Systems and methods for displaying wells and their respective status on an electronic map based on a geographical area, a time frame and a preferred well activity.

18 Claims, 2 Drawing Sheets

(56) References Cited

U.S. PATENT DOCUMENTS

| | | | |
|---|---|---|---|
| 2009/0024443 A1 | 1/2009 | Graham et al. | |
| 2009/0125367 A1 | 5/2009 | Brink et al. | |
| 2009/0229819 A1* | 9/2009 | Repin | E21B 47/00 166/250.01 |
| 2010/0013831 A1* | 1/2010 | Gilje | G01V 11/00 345/419 |
| 2010/0114493 A1* | 5/2010 | Vestal | E21B 44/00 702/9 |
| 2010/0114528 A1 | 5/2010 | Schipperijn et al. | |
| 2011/0125476 A1* | 5/2011 | Craig | E21B 43/16 703/10 |
| 2011/0175899 A1* | 7/2011 | Bittar | E21B 47/00 345/419 |
| 2011/0295575 A1 | 12/2011 | Levine et al. | |
| 2012/0209540 A1* | 8/2012 | Richardson | G06Q 10/06 702/45 |
| 2013/0100127 A1 | 4/2013 | Gilje et al. | |
| 2013/0161096 A1* | 6/2013 | Benson | E21B 7/04 175/26 |
| 2013/0271482 A1* | 10/2013 | Fendley | G06T 11/206 345/589 |
| 2014/0025413 A1* | 1/2014 | Yeager | G06Q 10/0631 705/7.12 |
| 2014/0246238 A1* | 9/2014 | Abbassian | E21B 44/00 175/40 |
| 2016/0003008 A1* | 1/2016 | Uribe | E21B 43/00 175/50 |

OTHER PUBLICATIONS

Australian Patent Application No. 2013392622, First Examination Report, dated Aug. 8, 2016, 3 pages.
Canadian Patent Application No. 2,913,193, Examiner's Letter, dated Oct. 18, 2016, 3 pages.
European Patent Application No. 13887376.5, Extended European Search Report, dated Nov. 25, 2016, 7 pages.
Russian Patent Application No. 2015149329/03(075923), First Office Action, dated Oct. 7, 2016, 10 pages.
Singapore Patent Application No. 11201509480R; Written Opinion, dated Mar. 7, 2016, 7 pages.
International Patent Application No. PCT/US2013/046958, International Search Report and Written Opinion; dated Dec. 20, 2013, 13 pages.
Canadian Patent Application No. 2,913,193, Office Action, dated Aug. 25, 2017, 5 pages.

* cited by examiner

SYSTEMS AND METHODS FOR DISPLAYING WELLS AND THEIR RESPECTIVE STATUS ON AN ELECTRONIC MAP

CROSS-REFERENCE TO RELATED APPLICATIONS

This application claims the priority of PCT Patent Application No. PCT/US13/46958, filed on Jun. 21, 2013, which is incorporated herein by reference.

STATEMENT REGARDING FEDERALLY SPONSORED RESEARCH

Not applicable.

FIELD OF THE INVENTION

The present invention generally relates to systems and methods for displaying wells and their respective status on an electronic map. More particularly, the present invention relates to displaying wells and their respective status on an electronic map based on a geographical area, a time frame and a preferred well activity.

BACKGROUND OF THE INVENTION

In the oil and gas industry, managing and optimizing drilling operations requires an information management system that can capture, track, report and analyze many activities at the rig or platform. Conventional information management systems may manage and track drilling and completion activities for a few wells or across an entire organization. In addition, such systems may manage operations for the full life of a well. Typically, each well must be identified from a list of wells to access such information. Once a well is identified, it may take additional steps to locate the relevant information such as, for example, the well activity. Even then, additional steps may be required to identify the well activity during a preferred time frame. Because of the volume of wells typically documented across an entire organization, this process of accessing information about a particular well can be very time consuming and inefficient.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

Figure 1:
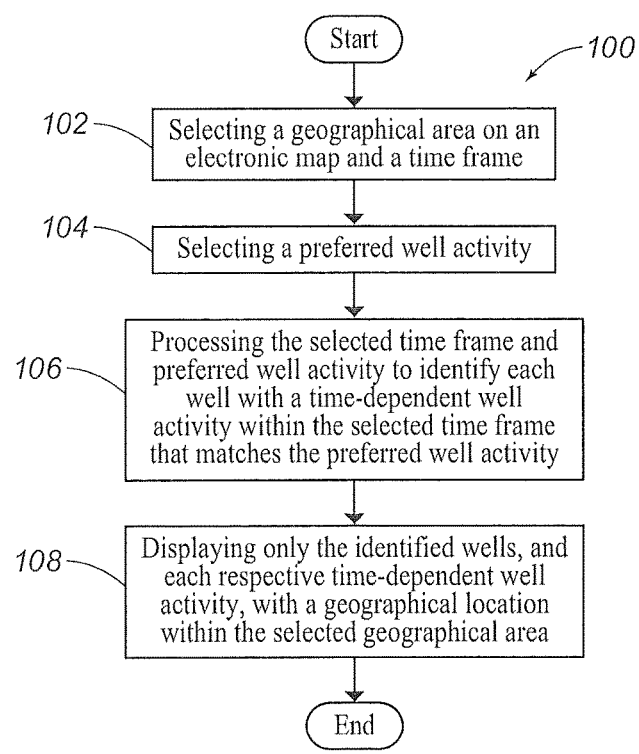
FIG. 1 is a flow diagram illustrating one embodiment of a method for implementing the present invention.

The present invention therefore, overcomes one or more deficiencies in the prior art by providing systems and methods for displaying wells and their respective status on an electronic map based on a geographical area, a time frame and a preferred well activity.

In one embodiment, the present invention includes a method for displaying wells and their respective status on an electronic map, which comprises i) selecting a geographical area on the electronic map and a time frame using at least one of a graphical user interface and default settings; ii) selecting a preferred well activity using the geographical user interface or the default settings, each well including a time-dependent well activity and a geographical location on the electronic map; iii) processing the selected time frame and the selected preferred well activity on a computer processor to identify each well with a time-dependent well activity within the selected time frame that matches the preferred well activity; and iv) displaying only the identified wells) with a geographical location within the selected geographical area, and each respective time-dependent well activity on the electronic map.

In another embodiment, the present invention includes a non-transitory program carrier device tangibly carrying computer executable instructions for displaying wells and their respective status on an electronic map, which comprises i) selecting a geographical area on the electronic map and a time frame using at least one of a graphical user interface and default settings; ii) selecting a preferred well activity using the geographical user interface or the default settings, each well including a time-dependent well activity and a geographical location on the electronic map; iii) processing the selected time frame and the selected preferred well activity to identify each well with a time-dependent well activity within the selected time frame that matches the preferred well activity; and iv) displaying only the identified well(s) with a geographical location within the selected geographical area, and each respective time-dependent well activity on the electronic map.

In yet another embodiment, the present invention includes a non-transitory program carrier device tangibly carrying computer executable instructions for displaying wells and their respective status on an electronic map, which comprises i) selecting a geographical area on the electronic map and a time frame; ii) selecting a preferred well activity, each well including a time-dependent well activity and a geographical location on the electronic map; iii) processing the selected time frame and the selected preferred well activity to identify each well with a time-dependent well activity within the selected time frame that matches the preferred well activity; and iv) displaying only the identified well(s) with a geographical location within the selected geographical area, and each respective time-dependent well activity on the electronic map.

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries to achieve similar results.

Method Description

Referring now to FIG. 1, a flow diagram of one embodiment of a method 100 for implementing the present invention is illustrated.

Figure 2:
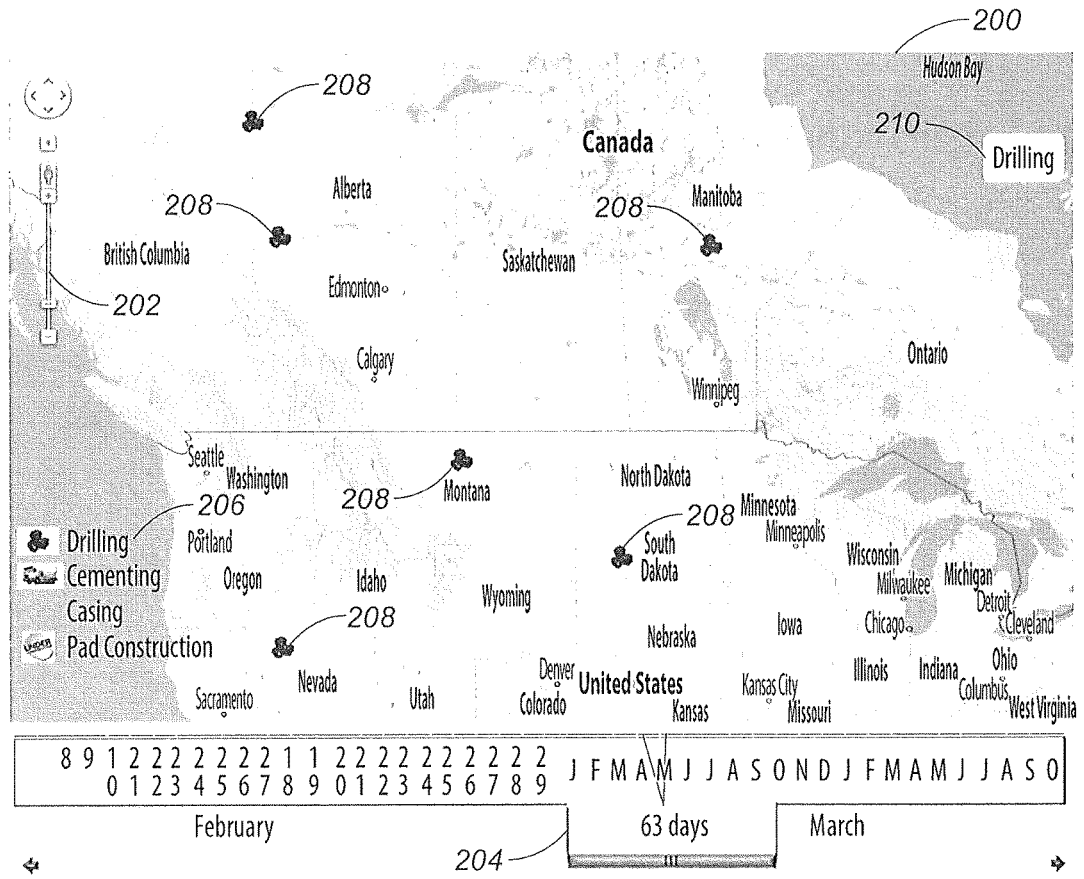
FIG. 2 is a display of an electronic map illustrating steps 102-108 in FIG. 1.

In step 102, a geographical area on an electronic map and a time frame are selected using at least one of a graphical user interface and default settings. If a graphical user interface is used, then the geographical area and/or the time frame may be selected using the client interface and/or the video interface described further in reference to FIG. 3. If default settings are used, then the geographical area and/or the time frame may be predetermined. In FIG. 2, for example, the electronic map 200 illustrates the selection of a geographical area (North America) and a time frame (63 days) using a graphical user interface and/or default settings. A sliding bar 202 may be used to adjust the selected geographical area and another sliding bar 204 may be used to adjust the selected time frame within a preferred month.

In step 104, a preferred well activity is selected using the graphical user interface or the default settings. If a graphical user interface is used, then the preferred well activity may be selected using the client interface and/or the video interface described further in reference to FIG. 3. If default settings are used, then the preferred well activity may be predetermined. In FIG. 2, for example, the electronic map 200 illustrates the selection of a preferred well activity (drilling) using the graphical user interface or the default settings. The preferred well activity may be selected based on an activities legend 206 using the activity filter box 210, which includes various well activities such as, for example, drilling, cementing, casing and pad construction. Each well includes a time-dependent well activity and a geographical location on the electronic map. A time-dependent well activity means an activity for a well that occurs over a given time frame. Each well therefore, may have a plurality of time-dependent well activities depending on the status of the well. For example, a mature well may have completed drilling, cementing and casing operations over different time frames resulting in three separate time-dependent well activities.

In step 106, the selected time frame and preferred well activity are processed to identify each well with a time-dependent well activity within the selected time frame that matches the preferred well activity.

Figure 3:
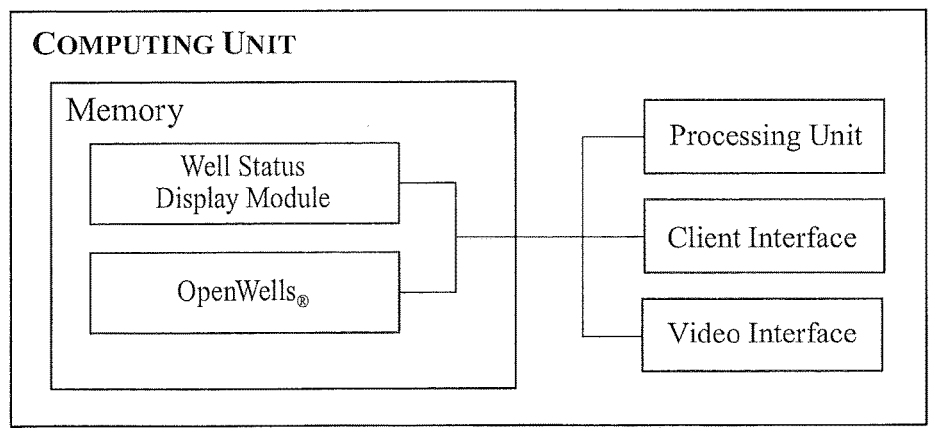
FIG. 3 is block diagram illustrating one embodiment of a computer system for implementing the present invention.

In step 108, only the identified well(s), and each respective time-dependent well activity, with a geographical location within the selected geographical area are displayed using the video interface described further in reference to FIG. 3. In FIG. 2, for example, only the identified wells 208 with a geographical location within the selected geographical area (North America) are displayed because each respective time-dependent well activity that lies within the selected time frame (63 days) matches the preferred well activity (drilling). In addition, each time-dependent well activity (drilling) is displayed as a symbol, however, may be displayed in text or any other manner sufficient to identify the time-dependent well activity. In FIG. 2, only six (6) identified wells are displayed with their respective time-dependent well activity (drilling) at their respective geographical locations. In this manner, the method 100 enables the display of preferred wells and their respective time-dependent well activity without requiring the name of the well or having to browse a list of wells to identify the preferred well(s).

System Description

The present invention may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. OpenWells®, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 3, a block diagram illustrates one embodiment of a system for implementing the present invention on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-2. The memory therefore, includes a well status display module, which enables the methods described in reference to step 106 in FIG. 1. The foregoing module may integrate functionality from the remaining application programs illustrated in FIG. 3. In particular, OpenWells® may be used as an interface application to perform steps 102, 104 and 108 in FIG. 1. OpenWells® includes an electronic map with data pertaining to each well such as, for example, the geographical location and time dependent well activities for each well and OpenWells® may be used on a desktop computer or mobile device with a processor. Although OpenWells® may be used as an interface application, other interface applications may be used, instead, or the well status display module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for displaying wells and their respective status on an electronic map, which comprises:
    receiving, using a computer processor, a selection of a geographical area on the electronic map via a graphical user interface and a selection of a time frame via a slider in the graphical user interface;
    receiving, using the computer processor, a selection of a preferred well activity via the graphical user interface or default settings, each well having an associated time-dependent well activity and a respective geographical location on the electronic map;
    identifying, using the computer processor, one or more wells that have a time-dependent well activity within the selected time frame that matches the preferred well activity; and
    displaying, using the computer processor, only the identified one or more wells that have a geographical location within the selected geographical area, and each associated time-dependent well activity, on the electronic map.

2. The method of claim 1, wherein the preferred well activity is selected using the graphical user interface.

3. The method of claim 1, wherein the preferred well activity is selected from a preferred well activity group comprising drilling, cementing, casing, and pad construction.

4. The method of claim 3, wherein the time-dependent well activity comprises drilling cementing, casing, or pad construction for the selected time frame.

5. The method of claim 1, wherein the electronic map is a global map.

6. The method of claim 1, wherein the selected time frame and the selected preferred well activity are processed on a mobile device.

7. A non-transitory program carrier device tangibly carrying computer executable instructions for displaying wells and their respective status on an electronic map, the instructions being executable to implement:
    receiving a selection of a geographical area on the electronic map via a graphical user interface and a selection of a time frame via a slider in the graphical user interface;
    receiving a selection of a preferred well activity via the graphical user interface or default settings, each well having an associated time-dependent well activity and a respective geographical location on the electronic map;
    identifying one or more wells that have a time-dependent well activity within the selected time frame that matches the preferred well activity; and
    displaying only the identified one or more wells that have a geographical location within the selected geographical area, and each associated time-dependent well activity, on the electronic map.

8. The program carrier device of claim 7, wherein the preferred well activity is selected using the graphical user interface.

9. The program carrier device of claim 7, wherein the preferred well activity is selected from a preferred well activity group comprising drilling, cementing, casing, and pad construction.

10. The program carrier device of claim 9, wherein the time-dependent well activity comprises drilling cementing, casing, or pad construction for the selected time frame.

11. The program carrier device of claim 7, wherein the electronic map is a global map.

12. The program carrier device of claim 7, wherein the selected time frame and the selected preferred well activity are processed on a mobile device.

13. A non-transitory program carrier device tangibly carrying computer executable instructions for displaying wells and their respective status on an electronic map, the instructions being executable to implement:

receiving a selection of a geographical area on the electronic map and a selection of a time frame via a graphical user interface;

receiving a selection of a preferred well activity, each well having an associated time-dependent well activity and a respective geographical location on the electronic map;

identifying one or more wells that have a time-dependent well activity within the selected time frame that matches the preferred well activity; and displaying only the identified one or more wells that have a geographical location within the selected geographical area, and each associated time-dependent well activity, on the electronic map.

14. The program carrier device of claim 13, wherein the preferred well activity is selected from a preferred well activity group comprising drilling, cementing, casing, and pad construction.

15. The program carrier device of claim 14, wherein the time-dependent well activity comprises drilling cementing, casing, or pad construction for the selected time frame.

16. The program carrier device of claim 13, wherein the selected time frame and the selected preferred well activity are processed on a mobile device.

17. The method of claim 1, wherein the slider is a first slider, and wherein the selection of the graphical area is received via a second slider in the graphical user interface.

18. The program carrier device of claim 13, wherein the selection of the time frame is received via a slider in the graphical user interface.

\* \* \* \* \*